US009161212B2

(12) United States Patent
Kitazoe

(10) Patent No.: US 9,161,212 B2
(45) Date of Patent: *Oct. 13, 2015

(54) METHOD AND APPARATUS FOR RE-SYNCHRONIZING OF TEMPORARY UE IDS IN A WIRELESS COMMUNICATION SYSTEM

(71) Applicant: QUALCOMM Incorporated, San Diego, CA (US)

(72) Inventor: Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/764,611

(22) Filed: Feb. 11, 2013

(65) Prior Publication Data

US 2013/0155981 A1 Jun. 20, 2013

Related U.S. Application Data

(63) Continuation of application No. 12/439,719, filed on Mar. 3, 2009, now Pat. No. 8,374,150.

(60) Provisional application No. 60/827,982, filed on Oct. 3, 2006.

(51) Int. Cl.
| | |
|---|---|
| *H04W 8/26* | (2009.01) |
| *H04W 72/04* | (2009.01) |
| *H04W 74/04* | (2009.01) |
| *H04W 74/08* | (2009.01) |

(52) U.S. Cl.
CPC ............ *H04W 8/26* (2013.01); *H04W 74/0833* (2013.01); *H04W 72/0413* (2013.01); *H04W 74/0866* (2013.01)

(58) Field of Classification Search
None
See application file for complete search history.

(56) References Cited

U.S. PATENT DOCUMENTS

| 6,473,410 | B1 | 10/2002 | Sakoda et al. | |
|---|---|---|---|---|
| 6,879,832 | B1* | 4/2005 | Palm et al. | 455/445 |

(Continued)

FOREIGN PATENT DOCUMENTS

| CN | 1343433 A | 4/2002 |
|---|---|---|
| EP | 1420551 A2 | 5/2004 |

(Continued)

OTHER PUBLICATIONS

European Search Report—EP14165363—Search Authority—Munich—Jun. 17, 2014.

(Continued)

*Primary Examiner* — Candal Elpenord
(74) *Attorney, Agent, or Firm* — Liem T. Do

(57) ABSTRACT

Methods and apparatuses for re-synchronizing Cell Radio Network Temporary Identifiers (C-RNTIs) in a wireless communication system are disclosed. In an aspect, a random access preamble is sent for random access by a user equipment (UE) and a random access response (RAR) is received that includes a temporary C-RNTI. If the UE already has a valid C-RNTI, a message is sent that includes the valid C-RNTI instead of the temporary C-RNTI as a C-RNTI for the UE. In another aspect, a random access preamble for random access is received and a RAR is sent that includes a temporary C-RNTI. A message is received that includes a valid C-RNTI instead of the temporary C-RNTI as a C-RNTI for a UE if the UE already has the valid C-RNTI.

43 Claims, 9 Drawing Sheets

(56) References Cited

U.S. PATENT DOCUMENTS

| | | |
|---|---|---|
| 7,328,013 B2 | 2/2008 | Vialen et al. |
| 7,684,788 B2 | 3/2010 | Farnsworth |
| 8,374,150 B2 | 2/2013 | Kitazoe |
| 2003/0130008 A1 | 7/2003 | Rajaniemi et al. |
| 2003/0211846 A1 | 11/2003 | Nagpal et al. |
| 2004/0264550 A1 | 12/2004 | Dabak |
| 2005/0043051 A1 | 2/2005 | Takano et al. |
| 2005/0186959 A1 | 8/2005 | Vialen et al. |
| 2006/0034250 A1 | 2/2006 | Kim et al. |
| 2007/0047493 A1 | 3/2007 | Park et al. |
| 2007/0206531 A1* | 9/2007 | Pajukoski et al. ............. 370/329 |
| 2007/0254656 A1 | 11/2007 | Dalsgaard |
| 2008/0019320 A1 | 1/2008 | Phan et al. |
| 2008/0167054 A1 | 7/2008 | Shaheen |
| 2008/0254800 A1 | 10/2008 | Chun et al. |
| 2009/0201891 A1 | 8/2009 | Lee et al. |
| 2010/0260140 A1 | 10/2010 | Zhu |

FOREIGN PATENT DOCUMENTS

| | | |
|---|---|---|
| RU | 2137150 | 9/1999 |
| WO | 0054521 A2 | 9/2000 |
| WO | 2005051009 A1 | 6/2005 |

OTHER PUBLICATIONS

3GPP TR R3.018 V0.1.0 (Jan. 2006), 3rd Generation Partnership Project, Technical Specification Group Radio Access Network, Evolved UTRA and UTRAN, Radio Access Architecture and Interfaces (Release 7), pp. 1-18.

3GPP TSG-RAN WG2 Meeting #54, RAN WG2,Tdoc R2-062546, LS on Random-Access Related Issues in E-UTRAN, Tallinn, Estonia, Aug. 28-Sep. 1, 2006, pp. 3.

3rd Generation Partnership Project, Technical Specification Group Radio Access Network Evolved Universal Terrestrial Radio Access (E-UTRA) and Evolved Universal Terrestrial Radio Access Network (E-UTRAN); Radio interface protocol aspects, Release 7, 3GPP TR 25.813 Technical Report, vol. 7.0.0 Jun. 2006.

Catt , "Initial access and C-RNTI allocation for TDD", 3GPP TSG RAN WG2 #54, R2-062394, Tallinn, Estonia, Aug. 28-Sep. 1, 2006.

International Preliminary Report on Patentability—PCT/US07/080165, The International Bureau of WIPO—Geneva, Switzerland—Apr. 7, 2009.

International Search Report—PCT/US07/080165, International Search Authority—Euopean Patent Office—Mar. 11, 2008.

Taiwan Search Report—TW096137094—TIPO—Mar. 22, 2011.

Written Opinion—PCT/US07/080165, International Search Authority—European Patent Office—Mar. 11, 2008.

* cited by examiner

METHOD AND APPARATUS FOR RE-SYNCHRONIZING OF TEMPORARY UE IDS IN A WIRELESS COMMUNICATION SYSTEM

The present application for patent is a Continuation of U.S. patent application Ser. No. 12/439,719, filed Mar. 3, 2009, entitled "RE-SYNCHRONIZATION OF TEMPORARY UE IDS IN A WIRELESS COMMUNICATION SYSTEM," which claims priority to provisional U.S. Application Ser. No. 60/827,982, entitled "C-RNTI RE-SYNCHRONIZATION IN E-UTRAN," filed Oct. 3, 2006, all of which are assigned to the assignee hereof and hereby expressly incorporated by reference herein in their entirety.

BACKGROUND

I. Field

The present disclosure relates generally to communication, and more specifically to techniques for re-synchronizing temporary user equipment identifiers (UE IDs) in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). Each base station may provide communication coverage for a particular geographic area. The overall coverage area of each base station may be partitioned into multiple (e.g., three) smaller areas. The term "cell" can refer to the smallest coverage area of a base station and/or a base station subsystem serving this coverage area.

A UE may communicate with one or more cells at any given moment. The UE may be assigned a temporary UE ID by each cell with which the UE is in communication. A temporary UE ID may be valid for only the cell that assigned the ID and may be used to uniquely identify the UE for communication with that cell. It is desirable to ensure that, at any given moment, the UE is assigned only one valid temporary UE ID by each cell with which the UE is in communication.

SUMMARY

In an aspect, a method of wireless communication is provided which includes sending a random access preamble for random access by a user equipment (UE) and receiving a random access response (RAR) that includes a temporary Cell Radio Network Temporary Identifier (C-RNTI). If the UE already has a valid C-RNTI, the method comprises sending a message that includes the valid C-RNTI instead of the temporary C-RNTI as a C-RNTI for the UE.

In another aspect, an apparatus for wireless communication is provided. The apparatus includes at least one processor and a memory coupled to the at least one processor. The at least one processor is configured to send a random access preamble for random access by a UE, to receive a RAR that includes a temporary C-RNTI, and to send a message that includes a valid C-RNTI instead of the temporary C-RNTI as a C-RNTI for the UE if the UE already has a valid C-RNTI.

In still another aspect, an apparatus for wireless communication is provided which includes means for sending a random access preamble for random access by a UE and means for receiving a RAR that includes a temporary C-RNTI. The apparatus further comprises means for sending a message that includes a valid C-RNTI instead of the temporary C-RNTI as a C-RNTI for the UE if the UE already has a valid C-RNTI.

In yet another aspect, a computer program product is provided which includes a non-transitory computer-readable medium. The computer-readable medium includes code for causing at least one computer to send a random access preamble for random access by a UE and code for causing the at least one computer to receive a RAR that includes a temporary C-RNTI. The computer-readable medium also includes code for causing the at least one computer to send a message that includes a valid C-RNTI instead of the temporary C-RNTI as a C-RNTI for the UE if the UE already has the valid C-RNTI.

In an aspect, a method of wireless communication is provided which includes receiving a random access preamble for random access and sending a RAR that includes a temporary C-RNTI. The method also includes receiving a message that includes a valid C-RNTI instead of the temporary C-RNTI as a C-RNTI for a UE if the UE already has the valid C-RNTI.

In another aspect, an apparatus for wireless communication is provided. The apparatus includes at least one processor and a memory coupled to the at least one processor. The at least one processor is configured to receive a random access preamble for random access and to send a RAR that includes a temporary C-RNTI. The at least one processor is also configured to receive a message that includes a valid C-RNTI instead of the temporary C-RNTI as a C-RNTI for a UE if the UE already has the valid C-RNTI.

In yet another aspect, an apparatus for wireless communication is provided which includes means for receiving a random access preamble for random access, means for sending a RAR that includes a temporary C-RNTI, and means for receiving a message that includes a valid C-RNTI instead of the temporary C-RNTI as a C-RNTI for a UE if the UE already has the valid C-RNTI.

In still another aspect, a computer program product is provided which includes a non-transitory computer-readable medium. The computer-readable medium includes code for causing at least one computer to receive a random access preamble for random access, code for causing the at least one computer to send a RAR that includes a temporary C-RNTI, and code for causing the at least one computer to receive a message that includes a valid C-RNTI instead of the temporary C-RNTI as a C-RNTI for a UE if the UE already has the valid C-RNTI.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
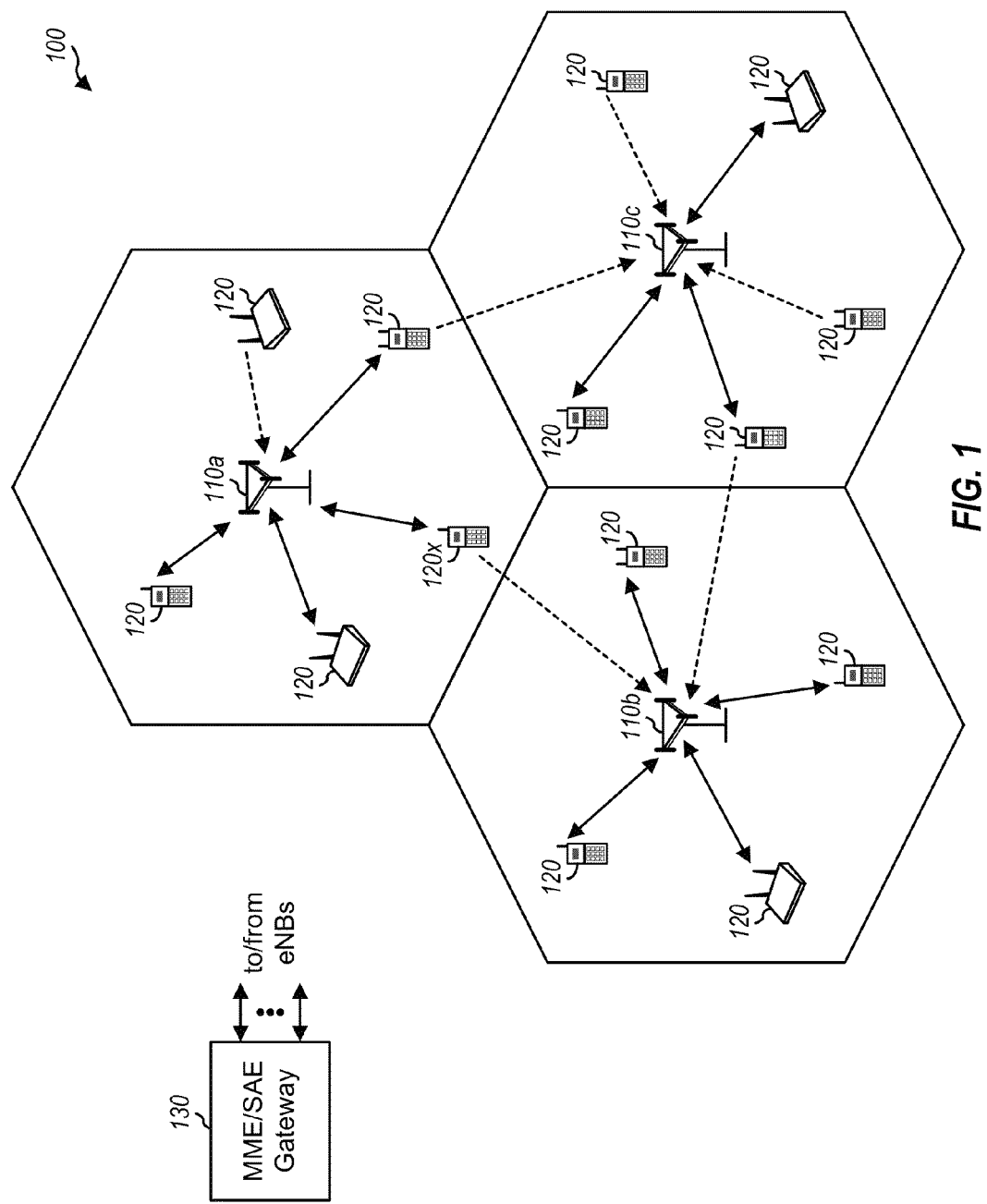
FIG. 1 shows a wireless multiple-access communication system.

FIG. 1 shows a wireless multiple-access communication system 100 with multiple evolved Node Bs (eNBs) 110. An eNB may be a fixed station used for communicating with the UEs and may also be referred to as a Node B, a base station, an access point, etc. Each eNB 110 provides communication coverage for a particular geographic area. In 3GPP, the term "cell" can refer to the smallest coverage area of an eNB and/or an eNB subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more eNBs via transmissions on the downlink and uplink. The downlink (or forward link) refers to the communication link from the eNBs to the UEs, and the uplink (or reverse link) refers to the communication link from the UEs to the eNBs. In FIG. 1, a solid line with double arrows indicates communication between a UE and an eNB. A broken line with a single arrow indicates a UE performing random access.

A Mobility Management Entity/System Architecture Evolution (MME/SAE) gateway 130 may couple to eNBs 110 and support communication for UEs 120. For example, MME/SAE gateway 130 may perform various functions such as distribution of paging messages to the eNBs, security control, idle state mobility control, SAE bearer control, ciphering and integrity protection of higher-layer signaling, termination of user plane packets for paging reasons, and switching of user plane for support of UE mobility. System 100 may include other network entities supporting other functions. The network entities in LTE are described in 3GPP TS 36.300, entitled "Evolved Universal Terrestrial Radio Access (E-UTRA) and Evolved Universal Terrestrial Radio Access Network (E-UTRAN); Overall description," March 2007, which is publicly available.

A UE may communicate with network entities in system 100 via a control plane and a user plane. A control plane is a mechanism for carrying higher-layer signaling. A user plane is a mechanism for carrying data for higher-layer applications.

Figure 2:
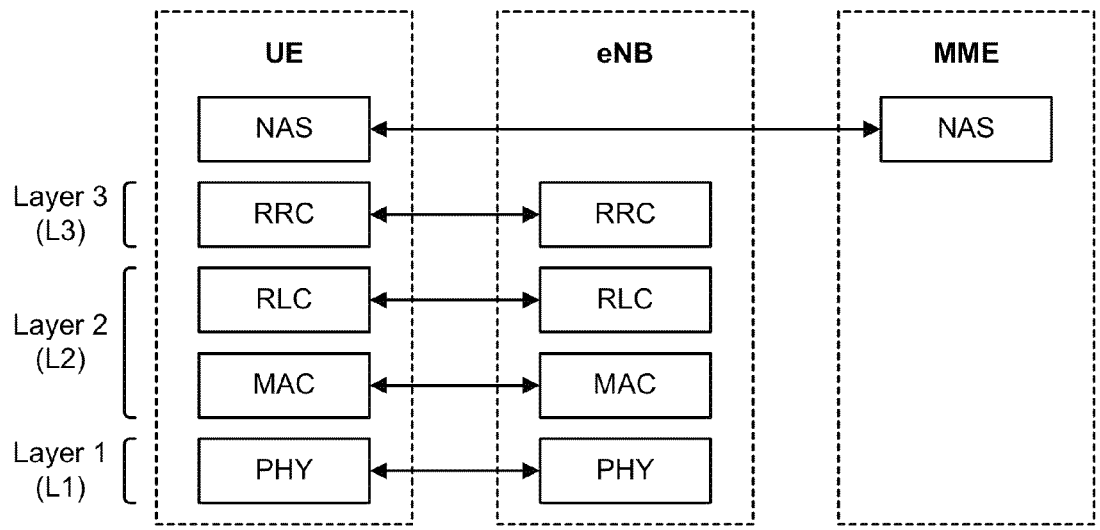
FIG. 2 shows protocol stacks for a UE and other network entities.

FIG. 2 shows protocol stacks at a UE, an eNB, and an MME/SAE gateway for the control plane in LTE. The protocol stack for the UE includes Non-Access Stratum (NAS), Radio Resource Control (RRC), Radio Link Control (RLC), Medium Access Control (MAC), and physical layer (PHY). NAS may perform functions such as SAE bearer management, authentication, mobility handling and paging origination for idle UEs, and security control. RRC may perform functions such as broadcast, paging, RRC connection management, radio bearer control, mobility functions, and UE measurement reporting and control. RLC may perform functions such as segmentation and re-assembly, reordering of data, and ARQ. MAC may perform functions such as mapping between logical and transport channels, multiplexing and demultiplexing of data, and HARQ. PHY may perform functions to exchange data over the air. RRC is part of Layer 3 (L3), RLC and MAC are part of Layer 2 (L2), and PHY is part of Layer 1 (L1). NAS is terminated at the MME/SAE gateway. RRC, RLC, MAC and PHY are terminated at the eNB.

Figure 3:
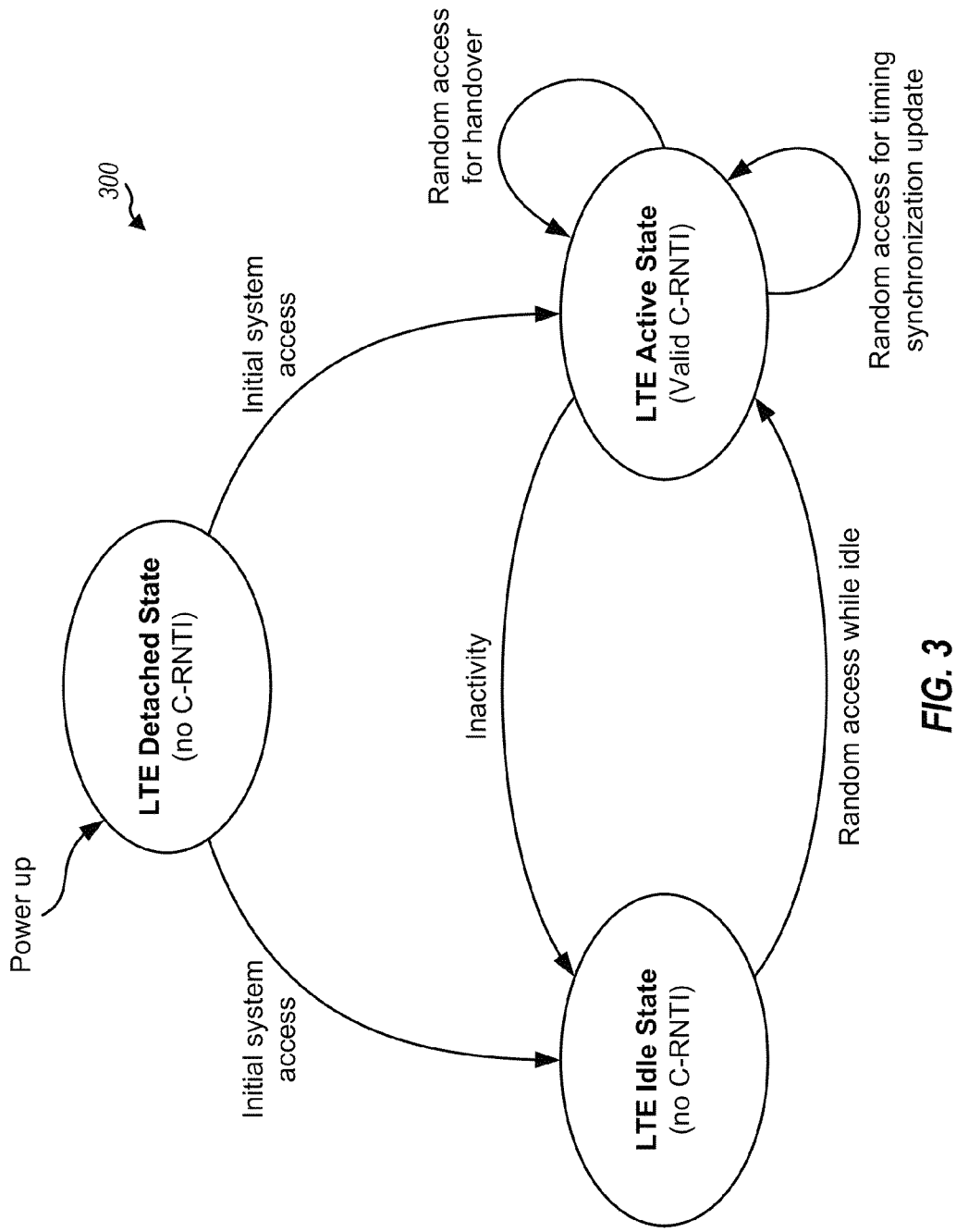
FIG. 3 shows a state diagram for the UE.

FIG. 3 shows a state diagram 300 for a UE in LTE. The UE may operate in one of several NAS states such as LTE Detached, LTE Idle and LTE Active states. Upon power up, the UE may enter the LTE Detached state and operate in an RRC_NULL state. In the LTE Detached state, the UE has not accessed the system and is not known by the system. The UE may perform initial system access and register with the system. The UE may have an active connection through the initial system access and registration procedure. The UE may then transition to either (i) the LTE Active state if the UE has data to exchange on the downlink or uplink or (ii) the LTE Idle state otherwise.

In the LTE Idle state, the UE may be idle and may operate in an RRC_IDLE state. In the LTE Idle state, the UE and the system may have context information to allow the UE to quickly transition to the LTE Active state. While in the LTE Idle state, the UE may perform random access and transition to the LTE Active state when there is data to send or receive. In the LTE Active state, the UE may actively communicate with the system on the downlink and/or uplink and may operate in an RRC_CONNECTED state. From the LTE Active state, the UE may transition back to the LTE Idle state due to inactivity. The UE may also transition between the various states in other manners.

A UE may be assigned a C-RNTI by a cell with which the UE is in communication. The C-RNTI is a temporary UE ID used to uniquely identify the UE to the cell and is valid only for that cell. The cell may assign the C-RNTI when the UE performs random access with that cell or becomes known to the cell in other manners. As shown in FIG. 3, the UE may not have an assigned C-RNTI while in the LTE Detached state or the LTE Idle state and may have an assigned C-RNTI while in the LTE Active state. C-RNTI may be part of RRC context for the UE and may be available only in the LTE Active state.

As shown in FIG. 3, a UE may perform a random access procedure for various scenarios such as:
  Initial system access from the LTE Detached state,
  Random access while in the LTE Idle state,
  Timing synchronization update while in the LTE Active state, and
  Random access for handover while in the LTE Active state.

The terms "random access" and "system access" are often used interchangeably.

Figure 4:
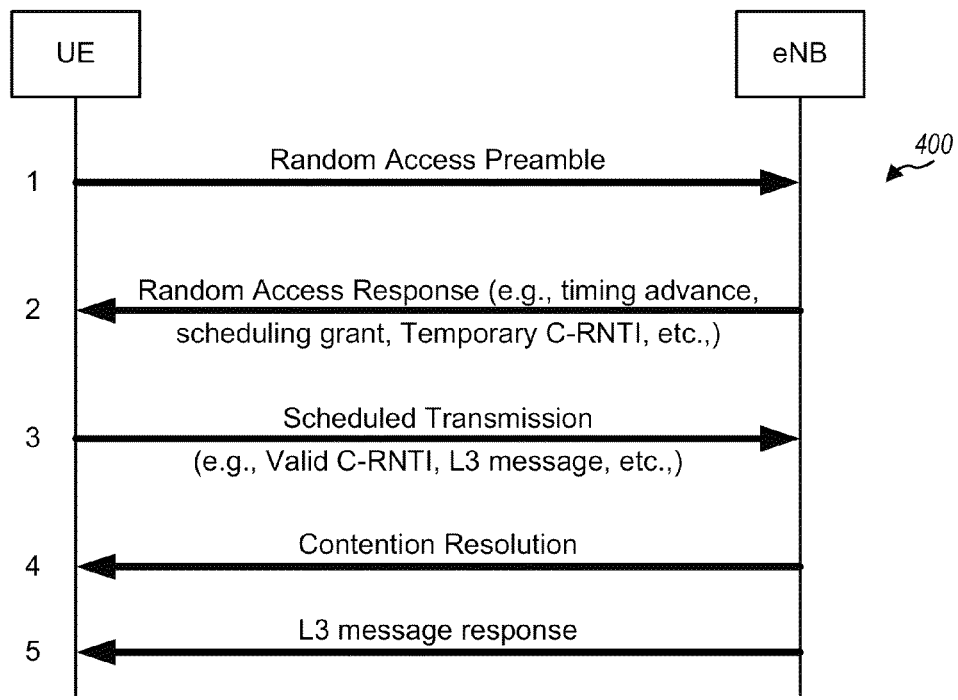
FIG. 4 shows a message flow for a random access procedure.

FIG. 4 shows a message flow for a design of a random access procedure 400. A UE may transmit a random access preamble on a Random Access Channel (RACH) in the uplink whenever the UE desires to access the system, e.g., for any of the scenarios noted above (step 1). The random access preamble may also be referred to as an access signature, an access probe, a random access probe, a signature sequence, a RACH signature sequence, etc. The random access preamble may include a random identifier (ID) that may be randomly selected by the UE and used to identify the random access preamble from the UE. The random access preamble may also include one or more additional bits for downlink channel quality indicator (CQI), access type, and/or other information. The downlink CQI may be indicative of the downlink channel quality as measured by the UE and may be used to send subsequent downlink transmission to the UE and/or to assign uplink (UL) resources to the UE. The access type may indicate any one of the reasons for random access noted above.

In one design, multiple RACHs may be available for use for random access. The UE may randomly select one of the available RACHs and transmit the random access preamble on the selected RACH. Each RACH may be associated with a different Random Access RNTI (RA-RNTI). For the initial part of the random access procedure, the UE may be identified by a combination of the RA-RNTI for the selected RACH and an RA-preamble identifier for the random access preamble sent by the UE.

An eNB may receive the random access preamble from the UE and may asynchronously respond by sending a random access response on a Downlink Shared Channel (DL-SCH) to the UE (step 2). The random access response may be addressed to the RA-RNTI and may convey the following:
  RA-preamble identifier—identify the random access preamble being responded to,
  Timing advance (TA)—indicate adjustment to the transmit timing of the UE,
  Uplink grant—indicate resources granted to the UE for uplink transmission, and
  Temporary C-RNTI—can be used as a C-RNTI for the UE.

The random access response may also include different and/or other information.

As shown in FIG. 3, the UE may perform random access while operating in any of the LTE states and may or may not already have a C-RNTI assigned to the UE. This C-RNTI may be referred to as a valid C-RNTI in the description herein. The UE may send the random access preamble as the very first signaling for random access. The design of the random access preamble may be such that the UE cannot inform the eNB whether the UE already has a valid C-RNTI (or the current LTE state of the UE) in the random access preamble. The eNB may allocate a Temporary C-RNTI to the UE regardless of whether or not the UE already has a valid C-RNTI. The eNB may then send this Temporary C-RNTI in the random access response to the UE. This early allocation of the Temporary C-RNTI may avoid the need to send another downlink message to assign a C-RNTI to the UE.

Referring back to FIG. 4, the UE may receive the random access response from the eNB and extract all of the information including the Temporary C-RNTI. In one design, if the UE does not already have a valid C-RNTI prior to performing random access, then the UE may use the Temporary C-RNTI as its C-RNTI. Conversely, if the UE already has a valid C-RNTI prior to performing random access, then the UE may continue to use this valid C-RNTI and discard the Temporary C-RNTI. The Temporary C-RNTI may thus be promoted to the C-RNTI if the UE detects successful random access and does not already have a valid C-RNTI. The Temporary C-RNTI may be dropped by the UE if it already has a valid C-RNTI.

The UE may then send a scheduled transmission on the uplink to the eNB (step 3). The scheduled transmission may include information indicating which C-RNTI will be used by the UE—the Temporary C-RNTI sent in the random access response or the valid C-RNTI if available. In a first design, the scheduled transmission includes the valid C-RNTI if it is available and does not include the Temporary C-RNTI. In a second design, the scheduled transmission includes the C-RNTI that will be used by the UE, which may be either the valid C-RNTI if available or the Temporary C-RNTI. For the first design, the eNB can determine that the UE already has a valid C-RNTI if this C-RNTI is received in the scheduled transmission. For the second design, the eNB can determine that the UE already has a valid C-RNTI if the C-RNTI received in the scheduled transmission is different from the Temporary C-RNTI sent in the random access response. In any case, the eNB can determine which C-RNTI will be used by the UE based on C-RNTI information (or absence of this information) in the scheduled transmission sent by the UE. If the UE already has a valid C-RNTI, then the eNB may receive this C-RNTI from the scheduled transmission, switch to this C-RNTI for the UE, and release the Temporary C-RNTI for later use.

The scheduled transmission in step 3 may also include other information such as downlink CQI, pilot measurement report, etc., which may be used for subsequent downlink transmission by the eNB. The scheduled transmission may also include other L3 messages, e.g., initial NAS message.

The eNB may send a message on the DL-SCH for contention resolution (step 4). A collision may occur when multiple UEs send the same random access preamble on the same RACH. Contention resolution may be performed to resolve which UE is granted access. The message in step 4 may be addressed to the Temporary C-RNTI sent in the random access response in step 2 and may contain any information pertinent for contention resolution, e.g., a core network level ID of the UE. The eNB may also send responses to the L3 messages, if any, sent by the UE in step 3 (step 5).

The design shown in FIG. 4 provides a convenient way to re-synchronize C-RNTI between the UE and the eNB. The design allows the same or similar message flows to be used for random access in various scenarios such as initial system access, transition to active state, timing synchronization update, handover, etc.

Figure 5:
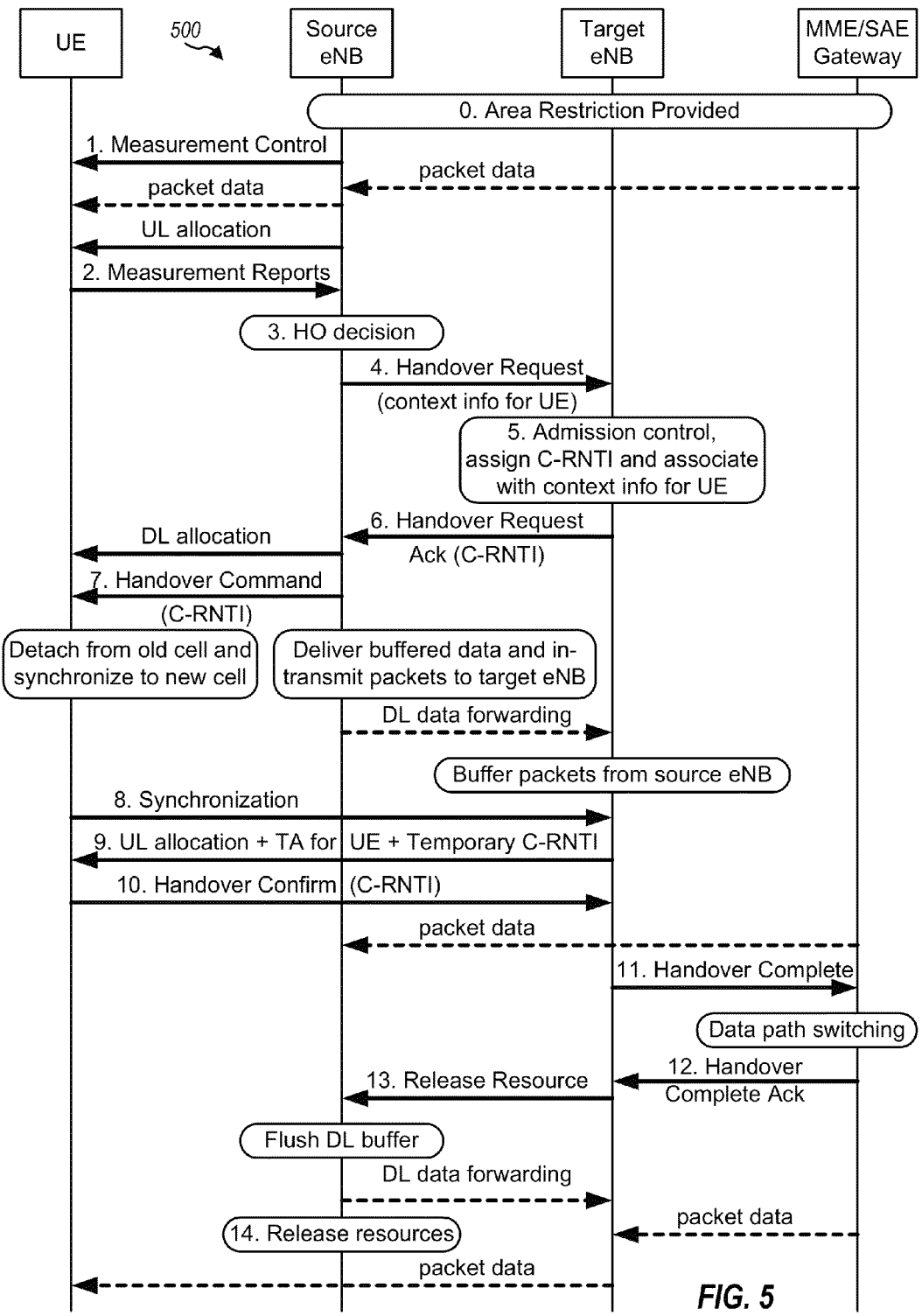
FIGS. 5 to 7 show three message flows for handover of the UE.

FIG. 5 shows a design of a message flow 500 for handover of a UE from a source eNB to a target eNB, e.g., handover of UE 120x from eNB 110a to eNB 110b in FIG. 1. For clarity, only signaling and functions pertinent for handover of the UE is described below.

The source eNB may configure measurement procedures for the UE (step 1), and the UE may send measurement reports to the source eNB (step 2). The source eNB may make a decision to hand off the UE (step 3) and may issue a Handover Request message to the target eNB (step 4). The source eNB may send context information for the UE, which may include RRC context, SAE bearer context, and/or other information used to support communication for the UE. The target eNB may perform admission control and may accept the handover of the UE (step 5). In one design, the target eNB may assign a C-RNTI to the UE and may associate the context information for the UE with this C-RNTI. The C-RNTI may thus be used as an identifier for the context information. The target eNB may then return a Handover Request Acknowledgement (Ack) to the source eNB (step 6). This Handover Request Ack may include the C-RNTI assigned to the UE.

The source eNB may then send a Handover Command to the UE (step 7). This Handover Command may include the C-RNTI assigned by the target eNB to the UE. The UE may thus have a valid C-RNTI for the target eNB even though the UE has not exchanged any signaling with the target eNB. The UE may then detach from the source eNB and perform random access with the target eNB. As part of the random access, the UE may perform synchronization to the target eNB and may start acquiring uplink timing advance (step 8). The target eNB may respond with resource allocation and timing advance for the UE (step 9).

In one design, for step 8, the UE may send a random access preamble on a RACH to the target eNB, which may correspond to step 1 in FIG. 4. The target eNB may receive the random access preamble but may not know the identity of the UE or that the target eNB has already assigned a C-RNTI to the UE. The target eNB may thus allocate a Temporary C-RNTI to the UE in the normal manner. For step 9, the target eNB may send a random access response on the DL-SCH to the UE, which may correspond to step 2 in FIG. 4. The random access response may include the Temporary C-RNTI and other information such as UL resource allocation, timing advance, etc. The UE may continue to use the valid C-RNTI received in step 7 and may discard the Temporary C-RNTI received in step 9.

Upon successfully accessing the target eNB, the UE may send a Handover Confirm message to the target eNB to indicate that the handover procedure is completed for the UE (step 10). This Handover Confirm message may include the C-RNTI assigned by the target eNB to the UE and received via the source eNB in step 7. The target eNB may recognize that the UE already has a valid C-RNTI based on the C-RNTI received from the Handover Confirm message. The target eNB may use this valid C-RNTI to match the UE with the context information received from the source eNB in step 4. The target eNB may release the Temporary C-RNTI for later use. Steps 8 to 10 in FIG. 5 may be considered as part of a random access procedure for handover.

The target eNB may send a Handover Complete message to inform the MME/SAE gateway that the UE has changed eNB (step 11). The MME/SAE gateway may then switch a downlink data path for the UE from the source eNB to the target eNB. The MME/SAE gateway may also return a Handover Complete Ack message to the target eNB (step 12). The target eNB may send a Release Resource message to the source eNB to indicate successful handover of the UE (step 13). Upon reception of the Release Resource message, the source eNB may release resources for the UE (step 14).

Figure 6:
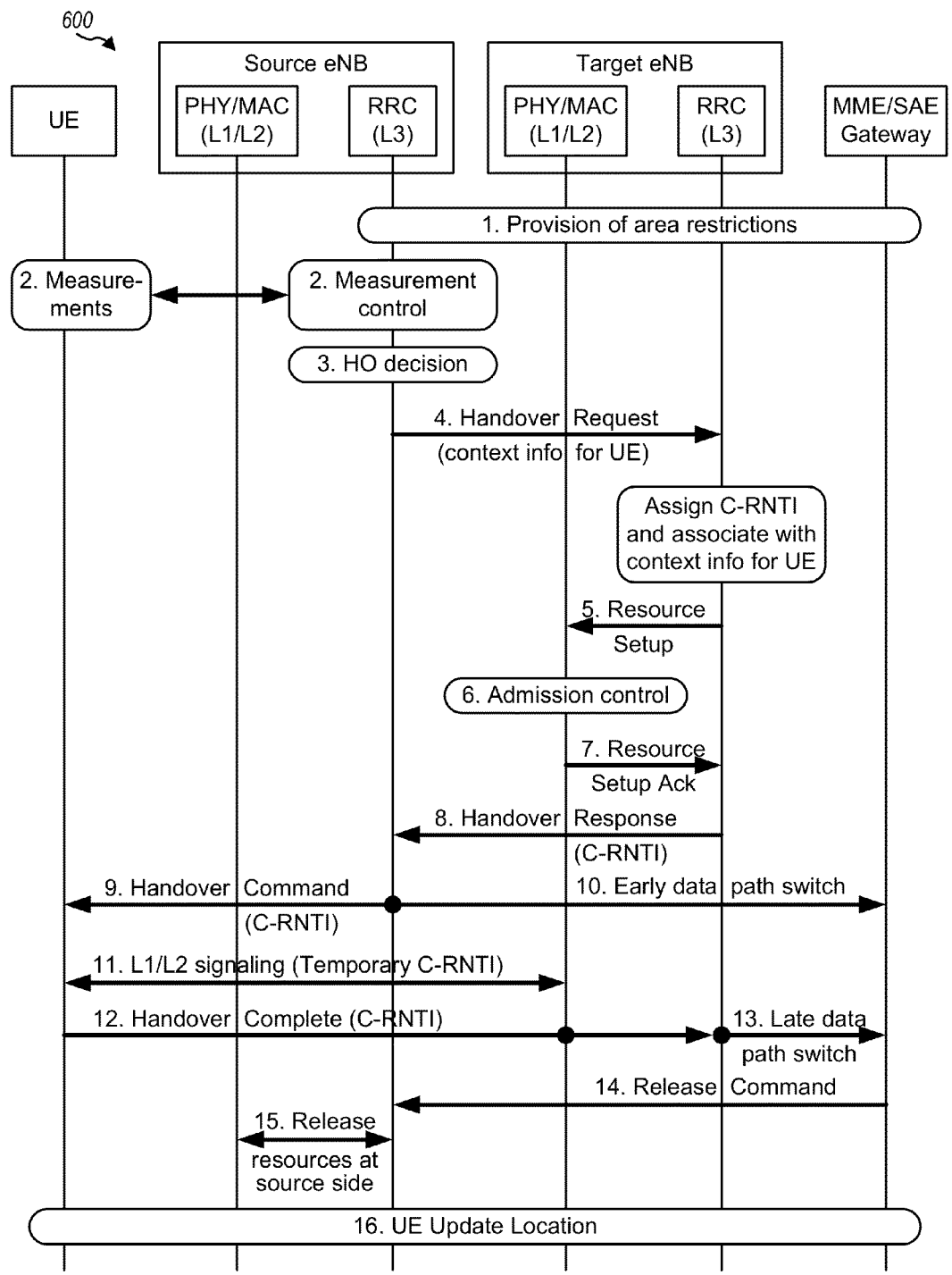

FIG. 6 shows a design of a message flow 600 for handover of a UE from a source eNB to a target eNB. FIG. 6 shows the PHY/MAC (L1/L2) and RRC (L3) as separate entities for each eNB. FIG. 6 also shows the signaling exchanged between the UE and the L1/L2 and L3 entities at the source and target eNBs for handover.

The source eNB may configure measurement procedures for the UE, and the UE may send measurement reports to the source eNB (step 2). The source eNB may make a decision to hand off the UE (step 3) and may send a Handover Request message and context information for the UE to the target eNB (step 4). In one design, RRC at the target eNB may assign a C-RNTI to the UE and may associate the context information for the UE with this C-RNTI. RRC at the target eNB may send a Resource Setup message to L1/L2 at the target eNB (step 5), which may perform admission control (step 6) and respond with a Resource Setup Ack (step 7). RRC at the target eNB may then return a Handover Response with the C-RNTI to the source eNB (step 8).

The source eNB may then send a Handover Command with the C-RNTI to the UE (step 9). The UE may perform random access with the target eNB (step 11). For step 11, the UE may send a random access preamble to the target eNB. The target eNB may allocate a Temporary C-RNTI to the UE and send a random access response with this Temporary C-RNTI to the UE. Upon successfully accessing the target eNB, the UE may send a Handover Complete message with the C-RNTI to the target eNB (step 12). The target eNB may recognize that the UE already has a valid C-RNTI based on the C-RNTI in the Handover Complete message being different from the Temporary C-RNTI in the random access response. The target eNB may use this valid C-RNTI to match the UE with the context information received from the source eNB in step 4. The target eNB may release the Temporary C-RNTI for later use.

The MME/SAE gateway may receive a message to switch data path for the UE from either the source eNB (step 10) or the target eNB (step 13). The MME/SAE gateway may then switch the data path for the UE from the source eNB to the target eNB and may return a Release Command to the source eNB (step 14). At the source eNB, RRC may inform L1/L2 to release resources for the UE (step 15).

Figure 7:
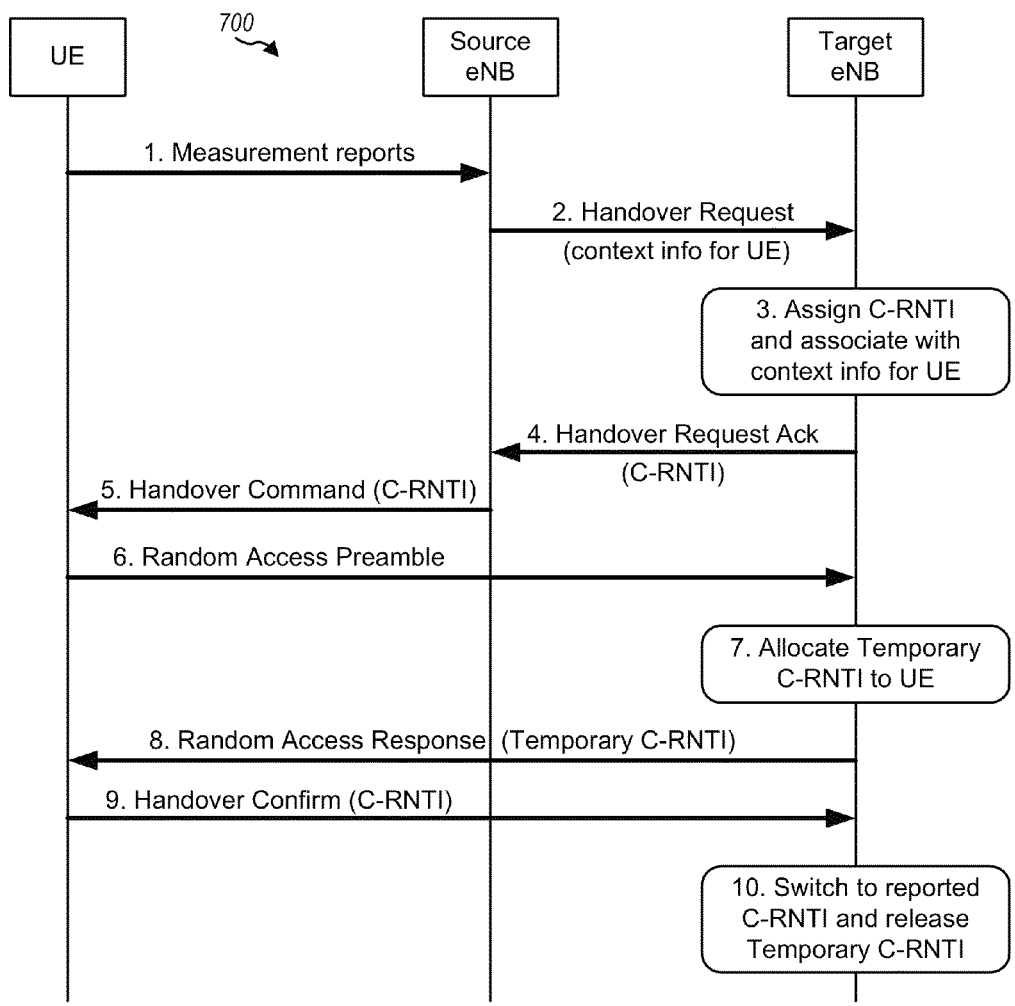

FIG. 7 shows a design of a message flow 700 for handover of a UE from a source eNB to a target eNB. Message flow 700 may be a stand-alone message flow or may be part of message flow 500 in FIG. 5 or message flow 600 in FIG. 6.

The UE may send measurement reports to the source eNB (step 1). The source eNB may make a decision to hand off the UE and may send a Handover Request message with context information for the UE to the target eNB (step 2). The target eNB may accept the handover, assign a C-RNTI to the UE, and associate the context information for the UE with this C-RNTI (step 3). The target eNB may then return a Handover Request Ack with the C-RNTI to the source eNB (step 4).

The source eNB may then send a Handover Command with the C-RNTI to the UE (step 5). The UE may perform random access with the target eNB and may send a random access preamble to the target eNB (step 6). The target eNB may allocate a Temporary C-RNTI to the UE (step 7) and may send a random access response with this Temporary C-RNTI and possibly other information to the UE (step 8). The UE may send a Handover Confirm message with the C-RNTI received in step 5 to the target eNB (step 9). The target eNB may recognize that the UE already has a valid C-RNTI based on the C-RNTI in the Handover Confirm message being different from the Temporary C-RNTI in the random access response. The target eNB may switch to this valid C-RNTI and release the Temporary C-RNTI (step 10).

FIGS. 5 through 7 show handover scenarios in which a UE already has a valid C-RNTI prior to performing random access. There may be other scenarios in which a UE has a valid C-RNTI prior to performing random access. For example, a UE may perform random access for uplink timing synchronization update while in the LTE Active state and communicating with a serving eNB.

For each case in which a UE performs random access when already having a valid C-RNTI, an eNB may assign a Temporary C-RNTI to the UE during the random access procedure. The UE may respond by sending the valid C-RNTI and may discard the Temporary C-RNTI. The eNB may use the valid C-RNTI to associate the UE with context information for the UE. The eNB may use the valid C-RNTI upon receiving it from the UE and may release the Temporary C-RNTI for later use.

A UE may also perform random access without having a valid C-RNTI, e.g., for initial system access, for random access from LTE Idle state, etc. In each such scenario, the UE may use the Temporary C-RNTI as a newly assigned C-RNTI. The UE may omit sending this C-RNTI in an uplink message (e.g., an RRC Connection Request message) to the eNB. The eNB may then assume that the UE is configured with this C-RNTI.

The techniques described herein may provide certain advantages. First, the same C-RNTI handling may be used for random access in various scenarios. This may simplify the random access procedure and/or allow the random access procedure to be used for more scenarios. Second, UEs that have already been assigned valid C-RNTIs may continue to use these C-RNTIs. The operation at these UEs and the eNBs may be simplified by avoiding changes to C-RNTIs when not necessary. Third, in handover scenario, transmission of an old C-RNTI assigned by the source eNB in the Handover Complete message is not needed.

In the designs described above, a UE may send a valid C-RNTI in a scheduled transmission after receiving a random access response for random access. In another design, the UE may send a core network temporary identity such as a Temporary Mobile Subscriber Identity (TMSI), a Packet-TMSI (P-TMSI), etc. An eNB may use to the core network temporary identity to identify context information for the UE. In another design, the UE may send an RRC identity associated with RRC context of the UE. The RRC identity may be allocated by an eNB for the first serving cell of the UE. The same RRC identify may be used for the UE even if the UE is handed over from eNB to eNB. The RRC identity may be made unique across the entire system by using an identity of the first serving cell as a subset of the RRC identity.

Figures 8, 9:
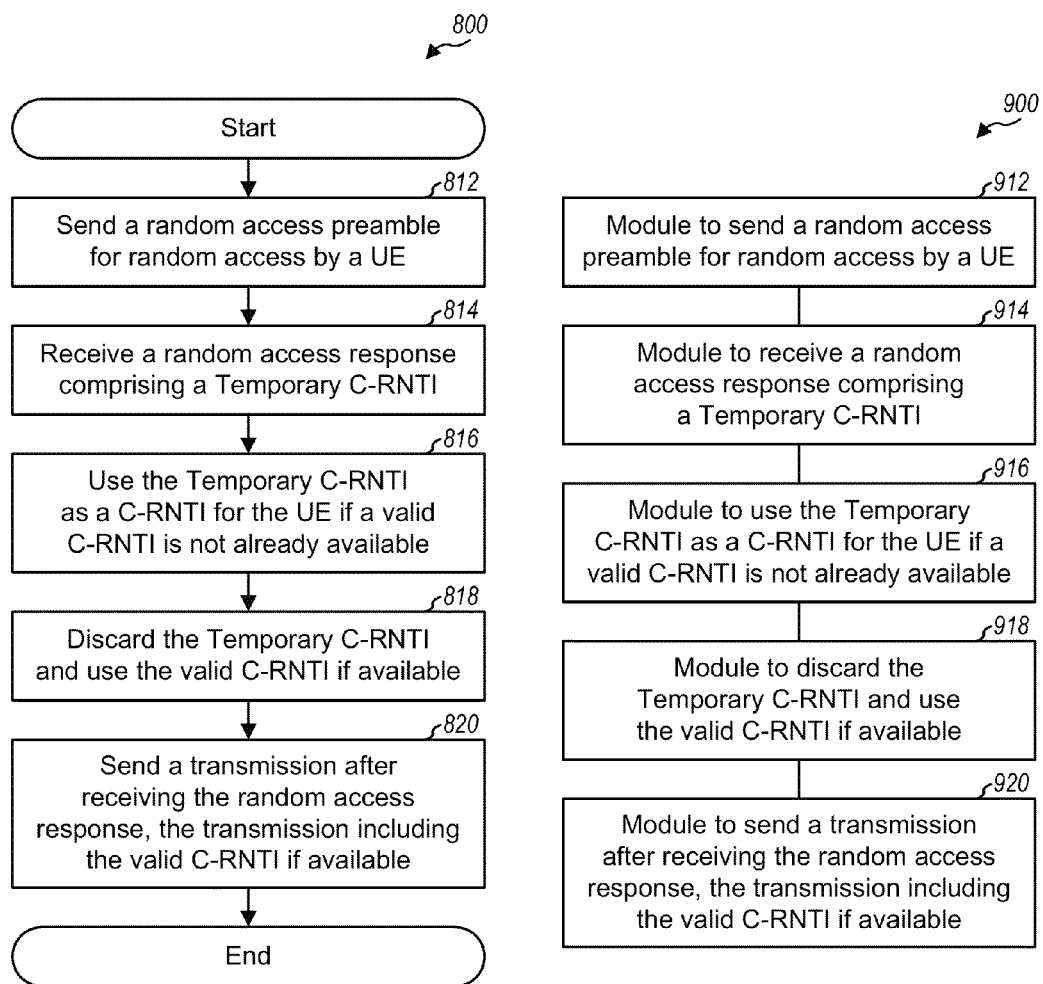
FIG. 8 shows a process for performing random access by the UE.
FIG. 9 shows an apparatus for performing random access.

FIG. 8 shows a design of a process 800 for performing random access by a UE. The UE may send a random access preamble for random access (block 812). The UE may receive a random access response comprising a Temporary C-RNTI (block 814). The UE may use the Temporary C-RNTI as a C-RNTI for itself if a valid C-RNTI is not already available (block 816). The UE may discard the Temporary C-RNTI and use the valid C-RNTI if available (block 818). The UE may send a transmission after receiving the random access response, and the transmission may include the valid C-RNTI if available (block 820). The transmission may omit or not include the Temporary C-RNTI if it is used as the C-RNTI for the UE.

The UE may perform process 800 for random access for various scenarios. For handover, the UE may receive the valid C-RNTI from a source base station prior to the random access. The valid C-RNTI may be assigned by a target base station, sent to the source base station, and forwarded by the source base station to the UE in a handover command. The UE may send the random access preamble for handover from the source base station to the target base station and may receive the random access response from the target base station.

The UE may send the random access preamble for initial system access and may use the Temporary C-RNTI as the C-RNTI for the UE. The UE may send the random access preamble for transition from an idle state to an active state and may also use the Temporary C-RNTI as the C-RNTI for the UE. The UE may send the random access preamble for timing synchronization update when the valid C-RNTI is available. The UE may then discard the Temporary C-RNTI and continue to use the valid C-RNTI.

In general, a C-RNTI may be any temporary UE ID used to identify a UE for communication with a cell. A C-RNTI may also be referred to as a MAC ID, etc. The C-RNTI and MAC ID are temporary UE IDs in that they may be valid for a communication session and are not permanently assigned to the UE for the lifetime of the UE.

FIG. 9 shows a design of an apparatus 900 for performing random access. Apparatus 900 includes means for sending a random access preamble for random access by a UE (module 912), means for receiving a random access response comprising a Temporary C-RNTI (module 914), means for using the Temporary C-RNTI as a C-RNTI for the UE if a valid C-RNTI is not already available (module 916), means for discarding the Temporary C-RNTI and using the valid C-RNTI if available (module 918), and means for sending a transmission after receiving the random access response, the transmission including the valid C-RNTI if available (module 920).

Figures 10, 11:
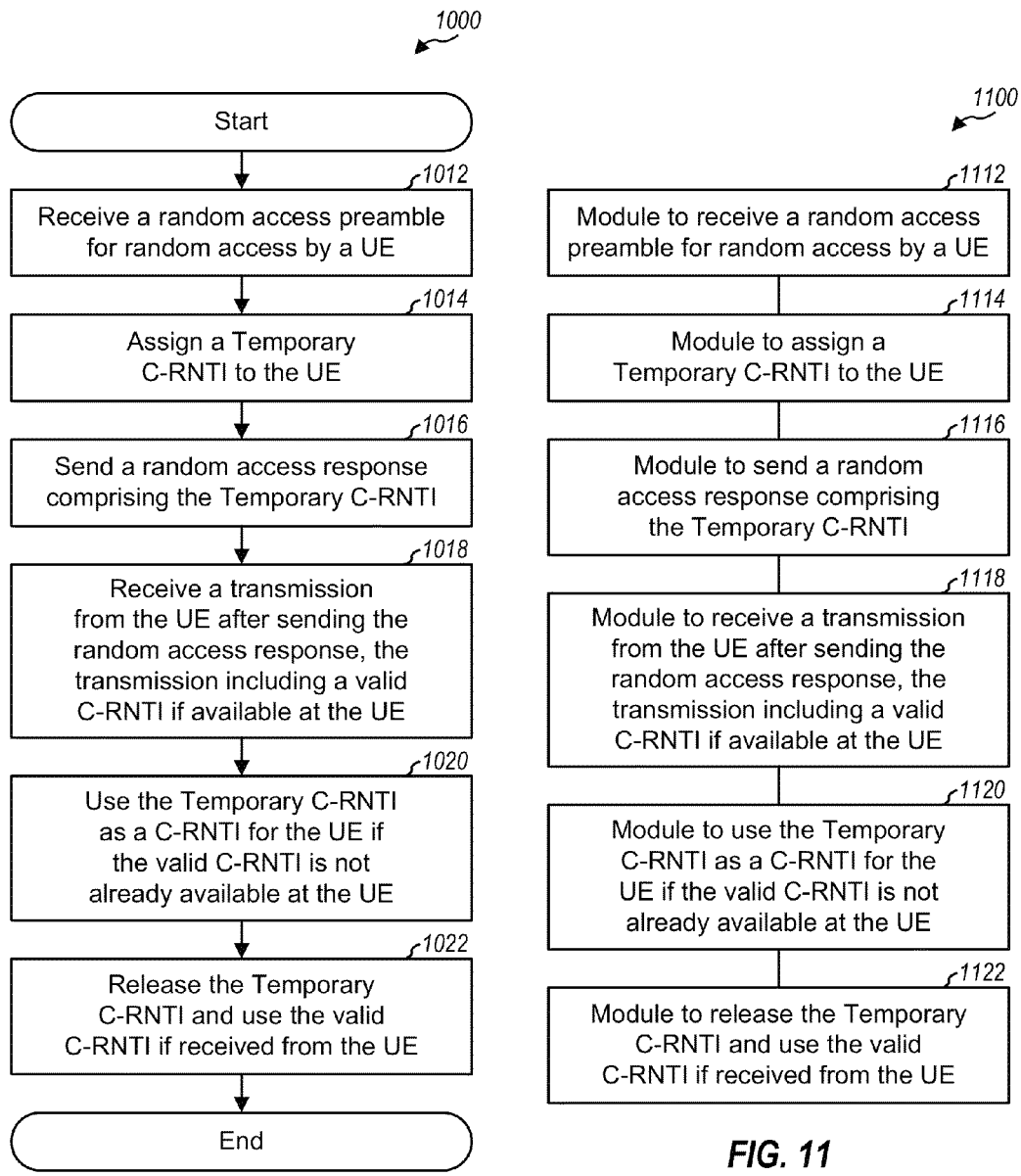
FIG. 10 shows a process for supporting random access by a base station.
FIG. 11 shows an apparatus for supporting random access.

FIG. 10 shows a design of a process 1000 for supporting random access by a base station, e.g., an eNB or a Node B. The base station may receive a random access preamble for random access by a UE (block 1012). The base station may assign a Temporary C-RNTI to the UE (block 1014) and may send a random access response comprising the Temporary C-RNTI to the UE (block 1016). The base station may receive a transmission from the UE after sending the random access response (block 1018). In one design, the transmission may include a valid C-RNTI if available at the UE and may not include the Temporary C-RNTI if it is used as a C-RNTI by the UE. The base station may use the Temporary C-RNTI as a C-RNTI for the UE if the valid C-RNTI is not already available at the UE (block 1020). The base station may release the Temporary C-RNTI and use the valid C-RNTI if received from the UE (block 1022).

The base station may perform process 1000 for various scenarios. For handover, the base station may be a target base station and may receive a handover request from a source base station for the UE. The target base station may assign the valid C-RNTI to the UE in response to the handover request and may send the valid C-RNTI to the source base station for forwarding to the UE. The target base station may thereafter receive the random access preamble from the UE for handover from the source base station to the target base station.

The base station may receive the random access preamble from the UE for initial system access and may use the Temporary C-RNTI as the C-RNTI for the UE. The base station may receive the random access preamble from the UE for transition from an idle state to an active state and may also use the Temporary C-RNTI as the C-RNTI for the UE. The base station may receive the random access preamble from the UE for timing synchronization update when the UE already has the valid C-RNTI. The base station may then release the Temporary C-RNTI and use the valid C-RNTI for the UE.

FIG. 11 shows a design of an apparatus 1100 for supporting random access. Apparatus 900 includes means for receiving a random access preamble for random access by a UE (module 1112), means for assigning a Temporary C-RNTI to the UE (module 1114), means for sending a random access response comprising the Temporary C-RNTI to the UE (module 1116), means for receiving a transmission from the UE after sending the random access response (module 1118), means for using the Temporary C-RNTI as a C-RNTI for the UE if the valid C-RNTI is not already available at the UE (module 1120), and means for releasing the Temporary C-RNTI and using the valid C-RNTI if received from the UE (module 1122).

The modules in FIGS. 9 and 11 may comprise processors, electronics devices, hardware devices, electronics components, logical circuits, memories, etc., or any combination thereof.

Figure 12:
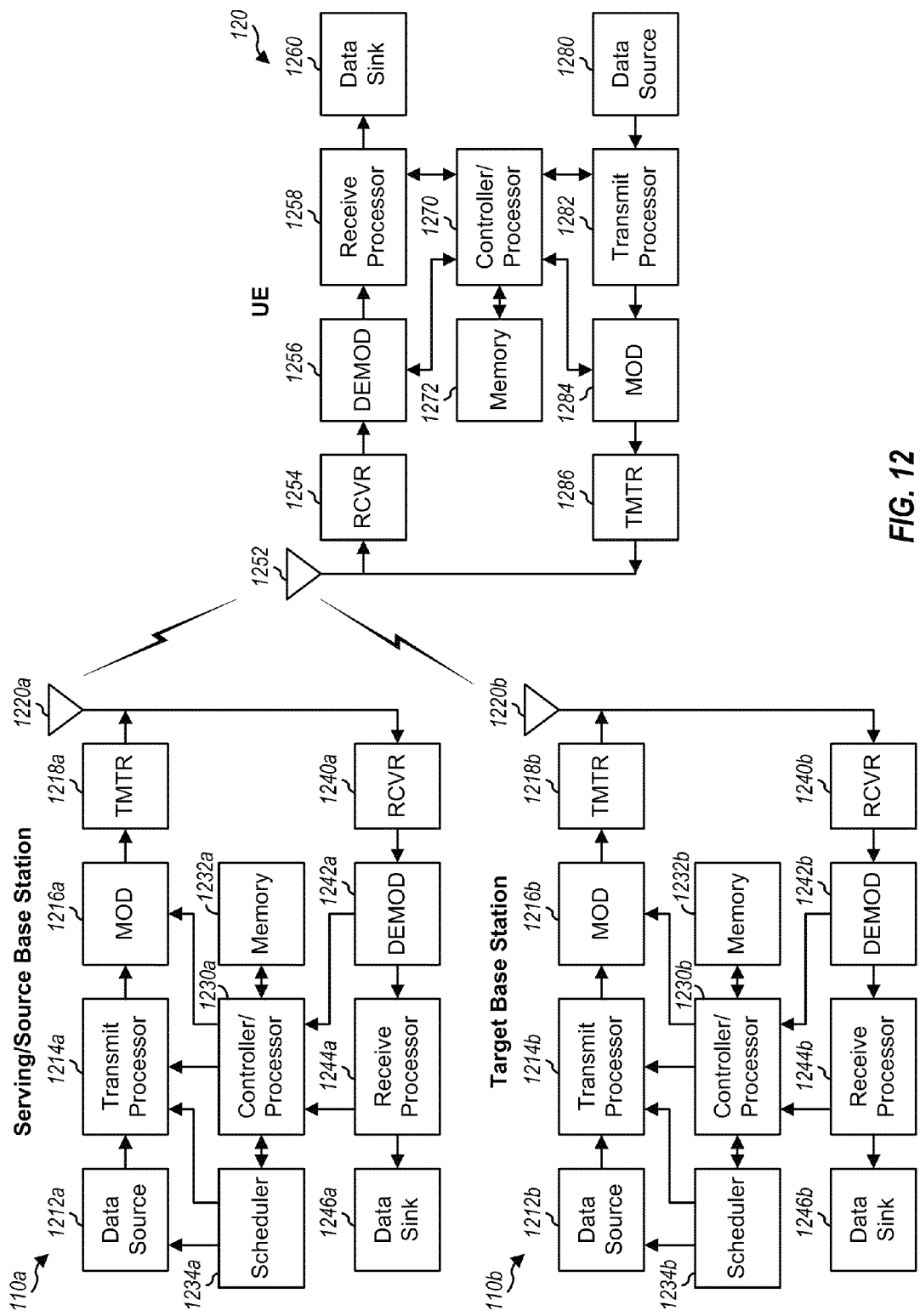
FIG. 12 shows a block diagram of the UE and two base stations.

FIG. 12 shows a block diagram of a design of a UE 120, serving/source base station 110a, and target base station 110b. At base station 110a, a transmit processor 1214a may receive traffic data from a data source 1212a and signaling from a controller/processor 1230a and a scheduler 1234a. For example, controller/processor 1230a may provide messages for random access and handover for UE 120. Scheduler 1234a may provide an assignment of DL and/or UL resources for UE 120. Transmit processor 1214a may process (e.g., encode, interleave, and symbol map) the traffic data, signaling, and pilot and provide data symbols, signaling symbols, and pilot symbols, respectively. A modulator (MOD) 1216a may perform modulation (e.g., for OFDM) on the data, signaling, and pilot symbols and provide output chips. A transmitter (TMTR) 1218a may conditions (e.g., convert to analog, amplify, filter, and upconvert) the output chips and generate a downlink signal, which may be transmitted via an antenna 1220a.

Base station 110b may similarly process traffic data and signaling for the UEs served by base station 110b. The traffic data, signaling, and pilot may be processed by a transmit processor 1214b, modulated by a modulator 1216b, conditioned by a transmitter 1218b, and transmitted via an antenna 1220b.

At UE 120, an antenna 1252 may receive the downlink signals from base stations 110a and 110b and possibly other base stations. A receiver (RCVR) 1254 may condition (e.g., filter, amplify, downconvert, and digitize) a received signal from antenna 1252 and provide samples. A demodulator (DE-MOD) 1256 may perform demodulation (e.g., for OFDM) on the samples and provide symbol estimates. A receive processor 1258 may process (e.g., symbol demap, deinterleave, and decode) the symbol estimates, provide decoded data to a data sink 1260, and provide decoded signaling to a controller/processor 1270.

On the uplink, a transmit processor 1282 may receive and process traffic data from a data source 1280 and signaling (e.g., for random access, handover, etc.) from controller/processor 1270. A modulator 1284 may perform modulation (e.g., for SC-FDM) on the symbols from processor 1282 and provide output chips. A transmitter 1286 may condition the output chips and generate an uplink signal, which may be transmitted via antenna 1252. At each base station, the uplink signals from UE 120 and other UEs may be received by antenna 1220, conditioned by a receiver 1240, demodulated by a demodulator 1242, and processed by a receive processor 1244. Processor 1244 may provide decoded data to a data sink 1246 and decoded signaling to controller/processor 1230.

Controllers/processors 1230a, 1230b and 1270 may direct the operation at base stations 110a and 110b and UE 120, respectively. Memories 1232a, 1232b and 1272 may store data and program codes for base stations 110a and 110b and UE 120, respectively. Schedulers 1234a and 1234b may schedule UEs for communication with base stations 110a and 110b, respectively, and may assign radio resources to the scheduled UEs.

The processors in FIG. 12 may perform various functions for the techniques described herein. For example, the processors at UE 120 may implement process 800 in FIG. 8, the processing for the UE in message flows 400, 500, 600 and 700, and/or other processes for the techniques described herein. The processors at each base station 110 may implement process 1000 in FIG. 10, the processing for the eNB in message flow 400, the processing for the source or target eNB in message flows 500, 600 and 700, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    sending a random access preamble for random access by a user equipment (UE);
    receiving a random access response (RAR) that includes a temporary Cell Radio Network Temporary Identifier (C-RNTI);
    using the temporary C-RNTI as a C-RNTI for the UE when a valid C-RNTI is not already available, wherein the valid C-RNTI is a C-RNTI for the UE from prior to performing the random access;
    discarding the temporary C-RNTI and using the valid C-RNTI when available; and
    sending a transmission after receiving the RAR, the transmission comprising the valid C-RNTI when available or the transmission not comprising C-RNTI information when the valid C-RNTI is not available.

2. The method of claim 1, further comprising:
    receiving a downlink transmission that is addressed to the valid C-RNTI.

3. The method of claim 1, wherein the transmission is a message 3 of a random access procedure.

4. The method of claim 1, further comprising, if the UE does not already have the valid C-RNTI prior to the random access:
    sending an uplink transmission that includes information indicating that the UE does not already have the valid C-RNTI;
    receiving a downlink transmission that is addressed to the temporary C-RNTI, the downlink transmission including a UE contention resolution identity; and
    setting the C-RNTI for the UE to a value of the temporary C-RNTI if the UE contention resolution identity matches the information in the uplink transmission.

5. The method of claim 1, further comprising:
    receiving the valid C-RNTI from a source base station prior to the random access;
    wherein the sending the random access preamble comprises sending the random access preamble for handover from the source base station to a target base station; and
    wherein the receiving the RAR comprises receiving the RAR that includes the temporary C-RNTI from the target base station.

6. The method of claim 1, wherein the sending the random access preamble comprises sending the random access preamble for a timing synchronization update when the valid C-RNTI is available, and wherein the temporary C-RNTI is discarded and the valid C-RNTI is used.

7. The method of claim 1, wherein the sending the random access preamble comprises sending the random access preamble for initial system access or for transition from an idle state to an active state when the valid C-RNTI is not available, and wherein the temporary C-RNTI is used as the C-RNTI for the UE.

8. An apparatus for wireless communication, comprising:
    at least one processor configured to:
        send a random access preamble for random access by a user equipment (UE),
        receive a random access response (RAR) that includes a temporary Cell Radio Network Temporary Identifier (C-RNTI),
        use the temporary C-RNTI as a C-RNTI for the UE when a valid C-RNTI is not already available, wherein the valid C-RNTI is a C-RNTI for the UE from prior to performing the random access,
        discard the temporary C-RNTI and using the valid C-RNTI when available, and
        send a transmission after receiving the RAR, the transmission comprising the valid C-RNTI when available or the transmission not comprising C-RNTI information when the valid C-RNTI is not available; and
    a memory coupled to the at least one processor.

9. The apparatus of claim 8, wherein the at least one processor is configured to:
    receive a downlink transmission that is addressed to the valid C-RNTI.

10. The apparatus of claim 8, wherein the transmission is a message 3 of a random access procedure.

11. The apparatus of claim 8, wherein the at least one processor is configured to, if the UE does not already have the valid C-RNTI prior to the random access:
    send an uplink transmission that includes information indicating that the UE does not already have the valid C-RNTI,
    receive a downlink transmission that is addressed to the temporary C-RNTI, the downlink transmission including a UE contention resolution identity, and
    set the C-RNTI for the UE to a value of the temporary C-RNTI if the UE contention resolution identity matches the information in the uplink transmission.

12. The apparatus of claim 8, wherein the at least one processor is configured to:

receive the valid C-RNTI from a source base station prior to the random access,
send the random access preamble for handover from the source base station to a target base station, and
receive the RAR from the target base station.

13. The apparatus of claim 12, wherein the valid C-RNTI is assigned by the target base station, sent to the source base station, and forwarded by the source base station in a handover command.

14. The apparatus of claim 8, wherein the at least one processor is configured to:
send the random access preamble for transition from an idle state to an active state if the UE does not already have the valid C-RNTI prior to the random access, and use the temporary C-RNTI as the C-RNTI for the UE.

15. The apparatus of claim 8, wherein the at least one processor is configured to send the random access preamble comprises sending the random access preamble for a timing synchronization update when the valid C-RNTI is available, and wherein the temporary C-RNTI is discarded and the valid C-RNTI is used.

16. The apparatus of claim 8, wherein the at least one processor is configured to send the random access preamble for initial system access or for transition from an idle state to an active state when the valid C-RNTI is not available, and wherein the temporary C-RNTI is used as the C-RNTI for the UE.

17. An apparatus for wireless communication, comprising:
means for sending a random access preamble for random access by a user equipment (UE);
means for receiving a random access response (RAR) that includes a temporary Cell Radio Network Temporary Identifier (C-RNTI);
means for using the temporary C-RNTI as a C-RNTI for the UE when a valid C-RNTI is not already available, wherein the valid C-RNTI is a C-RNTI for the UE from prior to performing the random access;
means for discarding the temporary C-RNTI and using the valid C-RNTI when available; and
means for sending a transmission after receiving the RAR, the transmission comprising the valid C-RNTI when available or the transmission not comprising C-RNTI information when the valid C-RNTI is not available.

18. The apparatus of claim 17, further comprising:
means for receiving a downlink transmission that is addressed to the valid C-RNTI.

19. The apparatus of claim 17, further comprising, if the UE does not already have the valid C-RNTI prior to the random access:
means for sending an uplink transmission that includes information indicating that the UE does not already have the valid C-RNTI;
means for receiving a downlink transmission that is addressed to the temporary C-RNTI, the downlink transmission including a UE contention resolution identity; and
means for setting the C-RNTI for the UE to a value of the temporary C-RNTI if the UE contention resolution identity matches the information in the uplink transmission.

20. The apparatus of claim 17, further comprising:
means for receiving the valid C-RNTI from a source base station prior to the random access;
wherein the means for sending the random access preamble comprises means for sending the random access preamble for handover from the source base station to a target base station; and
wherein the means for receiving the RAR comprises means for receiving the RAR that includes the temporary C-RNTI from the target base station.

21. The apparatus of claim 17, wherein the means for sending the random access preamble comprises means for sending the random access preamble for timing synchronization update if the UE already has the valid C-RNTI prior to the random access.

22. A computer program product, comprising a non-transitory computer-readable medium that includes:
code for causing at least one computer to send a random access preamble for random access by a user equipment (UE);
code for causing the at least one computer to receive a random access response (RAR) that includes a temporary Cell Radio Network Temporary Identifier (C-RNTI);
code for causing the at least one computer to use the temporary C-RNTI as a C-RNTI for the UE when a valid C-RNTI is not already available, wherein the valid C-RNTI is a C-RNTI for the UE from prior to performing the random access;
code for causing the at least one computer to discard the temporary C-RNTI and using the valid C-RNTI when available; and
code for causing the at least one computer to send a transmission after receiving the RAR, the transmission comprising the valid C-RNTI when available or the transmission not comprising C-RNTI information when the valid C-RNTI is not available.

23. The computer program product of claim 22, wherein the non-transitory computer-readable medium further comprises:
code for causing the at least one computer to receive a downlink transmission that is addressed to the valid C-RNTI.

24. The computer program product of claim 22, wherein the non-transitory computer-readable medium further comprises, if the UE does not already have the valid C-RNTI prior to the random access:
code for causing the at least one computer to send an uplink transmission that includes information indicating that the UE does not already have the valid C-RNTI;
code for causing the at least one computer to receive a downlink transmission that is addressed to the temporary C-RNTI, the downlink transmission including a UE contention resolution identity; and
code for causing the at least one computer to set the C-RNTI for the UE to a value of the temporary C-RNTI if the UE contention resolution identity matches the information in the uplink transmission.

25. A method for wireless communication, comprising:
receiving a random access preamble for random access by a user equipment (UE);
assigning a temporary Cell Radio Network Temporary Identifier (C-RNTI) to the UE;
sending a random access response (RAR) that includes the temporary C-RNTI;
receiving a transmission from the UE after sending the RAR, the transmission comprising a valid C-RNTI or the transmission not comprising C-RNTI information, and wherein the valid C-RNTI is a C-RNTI for the UE from prior to performing the random access;
using the temporary C-RNTI as a C-RNTI for the UE when the received transmission does not comprise C-RNTI information; and releasing the temporary C-RNTI and using the valid C-RNTI when the received transmission comprises the valid C-RNTI.

26. The method of claim 25, further comprising:
determining, based on the received message, that the UE already has the valid C-RNTI prior to the random access;
releasing the temporary C-RNTI based on the determination; and
sending a downlink transmission that is addressed to the valid C-RNTI.

27. The method of claim 25, further comprising:
receiving an uplink transmission that includes information indicating that the UE does not already have the valid C-RNTI prior to the random access; and
sending a downlink transmission that is addressed to the temporary C-RNTI, the downlink transmission including a UE contention resolution identity that corresponds with the information in the uplink transmission.

28. The method of claim 25, further comprising:
receiving, from a source base station, a handover request for the UE;
assigning the valid C-RNTI to the UE in response to the handover request; and
sending, to the source base station, the valid C-RNTI for forwarding to the UE, wherein the random access preamble is received from the UE for handover from the source base station to a target base station.

29. The method of claim 25, wherein the receiving the random access preamble comprises receiving the random access preamble from the UE for timing synchronization update when the UE already has the valid C-RNTI, wherein the method further comprises receiving a transmission comprising the valid C-RNTI from the UE after sending the random access response, and wherein the temporary C-RNTI is released and the valid C-RNTI is used for the UE.

30. The method of claim 25, wherein the receiving the random access preamble comprises receiving the random access preamble from the UE for initial system access or for transition from an idle state to an active state, and wherein the temporary C-RNTI is used as the C-RNTI for the UE.

31. An apparatus for wireless communication, comprising:
at least one processor configured to:
receive a random access preamble for random access by a user equipment (UE);
assign a temporary Cell Radio Network Temporary Identifier (C-RNTI) to the UE;
send a random access response (RAR) that includes the temporary C-RNTI;
receive a transmission from the UE after sending the RAR, the transmission comprising a valid C-RNTI or the transmission not comprising C-RNTI information, and wherein the valid C-RNTI is a C-RNTI for the UE from prior to performing the random access;
use the temporary C-RNTI as a C-RNTI for the UE when the received transmission does not comprise C-RNTI information; and
release the temporary C-RNTI and using the valid C-RNTI when the received transmission comprises the valid C-RNTI; and
a memory coupled to the at least one processor.

32. The apparatus of claim 31, wherein the at least one processor is configured to:
determine, based on the received message, that the UE already has the valid C-RNTI prior to the random access,
release the temporary C-RNTI based on the determination, and send a downlink transmission that is addressed to the valid C-RNTI.

33. The apparatus of claim 31, wherein the at least one processor is configured to:
receive an uplink transmission that includes information indicating that the UE does not already have the valid C-RNTI prior to the random access, and
send a downlink transmission that is addressed to the temporary C-RNTI, the downlink transmission including a UE contention resolution identity that corresponds with the information in the uplink transmission.

34. The apparatus of claim 31, wherein the at least one processor is configured to:
receive, from a source base station, a handover request for the UE,
assign the valid C-RNTI to the UE in response to the handover request,
send, to the source base station, the valid C-RNTI for forwarding to the UE, and
receive, from the UE, the random access preamble for handover from the source base station to a target base station.

35. The apparatus of claim 31, wherein the at least one processor is configured to receiving the random access preamble from the UE for timing synchronization update when the UE already has the valid C-RNTI, wherein the method further comprises receiving a transmission comprising the valid C-RNTI from the UE after sending the random access response, and wherein the temporary C-RNTI is released and the valid C-RNTI is used for the UE.

36. The apparatus of claim 31, wherein the at least one processor is configured to receive the random access preamble from the UE for initial system access or for transition from an idle state to an active state, and wherein the temporary C-RNTI is used as the C-RNTI for the UE.

37. An apparatus for wireless communication, comprising:
means for receiving a random access preamble for random access by a user equipment (UE);
means for assigning a temporary Cell Radio Network Temporary Identifier (C-RNTI) to the UE;
means for sending a random access response (RAR) that includes the temporary C-RNTI;
means for receiving a transmission from the UE after sending the RAR, the transmission comprising a valid C-RNTI or the transmission not comprising C-RNTI information, and wherein the valid C-RNTI is a C-RNTI for the UE from prior to performing the random access;
means for using the temporary C-RNTI as a C-RNTI for the UE when the received transmission does not comprise C-RNTI information; and
means for releasing the temporary C-RNTI and using the valid C-RNTI when the received transmission comprises the valid C-RNTI.

38. The apparatus of claim 37, further comprising:
means for determining, based on the received message, that the UE already has the valid C-RNTI prior to the random access;
means for releasing the temporary C-RNTI based on the determination; and
means for sending a downlink transmission that is addressed to the valid C-RNTI.

39. The apparatus of claim 37, further comprising:
means for receiving an uplink transmission that includes information indicating that the UE does not already have the valid C-RNTI prior to the random access; and
means for sending a downlink transmission that is addressed to the temporary C-RNTI, the downlink transmission including a UE contention resolution identity that corresponds with the information in the uplink transmission.

40. The apparatus of claim 37, further comprising:
means for receiving, from a source base station, a handover request for the UE;
means for assigning the valid C-RNTI to the UE in response to the handover request; and
means for sending, to the source base station, the valid C-RNTI for forwarding to the UE, wherein the random access preamble is received from the UE for handover from the source base station to a target base station.

41. A computer program product, comprising a non-transitory computer-readable medium that includes:
code for causing at least one computer to receive a random access preamble for random access by a user equipment (UE);
code for causing the at least one computer to assign a temporary Cell Radio Network Temporary Identifier (C-RNTI) to the UE;
code for causing the at least one computer to send a random access response (RAR) that includes the temporary C-RNTI;
code for causing the at least one computer to receive a transmission from the UE after sending the RAR, the transmission comprising a valid C-RNTI or the transmission not comprising C-RNTI information, and wherein the valid C-RNTI is a C-RNTI for the UE from prior to performing the random access;
code for causing the at least one computer to use the temporary C-RNTI as a C-RNTI for the UE when the received transmission does not comprise C-RNTI information; and
code for causing the at least one computer to release the temporary C-RNTI and using the valid C-RNTI when the received transmission comprises the valid C-RNTI.

42. The computer program product of claim 41, wherein the non-transitory computer-readable medium further comprises:
code for causing the at least one computer to determine, based on the received message, that the UE already has the valid C-RNTI prior to the random access,
code for causing the at least one computer to release the temporary C-RNTI based on the determination, and
code for causing the at least one computer to send, a downlink transmission that is addressed to the valid C-RNTI.

43. The computer program product of claim 41, wherein the non-transitory computer-readable medium further comprises:
code for causing the at least one computer to receive an uplink transmission that includes information indicating that the UE does not already have the valid C-RNTI prior to the random access, and
code for causing the at least one computer to send a downlink transmission that is addressed to the temporary C-RNTI, the downlink transmission including a UE contention resolution identity that corresponds with the information in the uplink transmission.

* * * * *